(12) United States Patent
Cecilia Torralba et al.

(10) Patent No.: US 9,479,600 B2
(45) Date of Patent: Oct. 25, 2016

(54) METHODS AND APPARATUSES FOR INITIATING PROVISIONING OF SUBSCRIBER DATA IN A HSS OF AN IP MULTIMEDIA SUBSYSTEM NETWORK

(75) Inventors: Fernando Cecilia Torralba, Madrid (ES); Tore Johansson, Karlskrona (SE); Håkan Österlund, Ekerö (SE); Maria Esther Terrero Díaz-Chirón, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1352 days.

(21) Appl. No.: 13/377,794

(22) PCT Filed: Jul. 9, 2009

(86) PCT No.: PCT/EP2009/058772
§ 371 (c)(1),
(2), (4) Date: Dec. 12, 2011

(87) PCT Pub. No.: WO2011/003454
PCT Pub. Date: Jan. 13, 2011

(65) Prior Publication Data
US 2012/0096162 A1    Apr. 19, 2012

(51) Int. Cl.
*G06F 15/173* (2006.01)
*H04L 29/08* (2006.01)
(Continued)

(52) U.S. Cl.
CPC .............. *H04L 67/16* (2013.01); *H04W 4/001* (2013.01); *H04L 65/1016* (2013.01); *H04L 65/1073* (2013.01); *H04W 8/265* (2013.01)

(58) Field of Classification Search
CPC .............. H04L 67/16; H04L 65/1016; H04L 65/1073; H04W 4/001; H04W 8/265
USPC ....... 709/201, 202, 204, 205, 212, 213, 214, 709/216, 217, 218, 219, 223, 225, 226, 227, 709/229
See application file for complete search history.

(56) References Cited

U.S. PATENT DOCUMENTS

| 2003/0027581 A1 | 2/2003 | Jokinen et al. |
| 2006/0046752 A1* | 3/2006 | Kalavade ................ H04W 4/12 455/466 |

(Continued)

FOREIGN PATENT DOCUMENTS

| EP | 1679925 A1 * | 7/2006 |
| WO | WO 2008117124 A2 * | 10/2008 |

(Continued)

OTHER PUBLICATIONS

English Translation of Russian Office Action RU Patent Application No. 2012104527, 6 pg.

(Continued)

*Primary Examiner* — Phuoc Nguyen
*Assistant Examiner* — Davoud Zand
(74) *Attorney, Agent, or Firm* — Myers Bigel & Sibley, PA (57) ABSTRACT

A method of initiating the provisioning of subscriber data in at least a Home Subscriber Server of an IP Multimedia Subsystem network. The method comprises receiving an authentication request or Session Initiation Protocol message in respect of a given subscriber who is making use of a user terminal to access the IP Multimedia Subsystem network. If it is determined that subscriber data is not currently provisioned for the subscriber in a Home Subscriber Server function or receiving such a determination, the following steps are performed: 1) causing a first notification to be sent to the user terminal indicating that the registration attempt is rejected, and 2) sending a second notification to a subscriber provisioning system informing the provisioning system of the registration attempt.

17 Claims, 5 Drawing Sheets

(51) Int. Cl.
*H04W 4/00* (2009.01)
*H04W 8/26* (2009.01)
*H04L 29/06* (2006.01)

(56) References Cited

U.S. PATENT DOCUMENTS

| | | | |
|---|---|---|---|
| 2006/0058028 A1* | 3/2006 | Allison et al. | 455/435.1 |
| 2007/0150480 A1* | 6/2007 | Hwang | G06Q 10/00 |
| 2007/0288655 A1* | 12/2007 | Price et al. | 709/245 |
| 2008/0101552 A1* | 5/2008 | Khan et al. | 379/45 |
| 2008/0117893 A1* | 5/2008 | Witzel | H04W 80/10 370/352 |
| 2008/0239998 A1* | 10/2008 | Ogami | H04L 12/66 370/265 |
| 2008/0317010 A1* | 12/2008 | Naqvi | H04L 65/1016 370/355 |
| 2008/0318551 A1 | 12/2008 | Palamara et al. | |
| 2009/0116404 A1* | 5/2009 | Mahop | H04L 41/0213 370/254 |
| 2009/0129263 A1* | 5/2009 | Osborn | 370/230 |
| 2009/0156213 A1* | 6/2009 | Spinelli et al. | 455/436 |
| 2010/0048174 A1* | 2/2010 | Osborn | 455/411 |
| 2010/0048176 A1* | 2/2010 | Osborn | 455/411 |

FOREIGN PATENT DOCUMENTS

| | | |
|---|---|---|
| WO | WO 2009/053918 A1 | 4/2009 |
| WO | WO 2009064576 A1 * | 5/2009 |

OTHER PUBLICATIONS

PCT International Search Report, Application No. PCT/EP2009/058772, Oct. 11, 2010.
Written Opinion of the International Searching Authority, Application No. PCT/EP2009/058772, Oct. 11, 2010.
PCT International Preliminary Report on Patentability, Application No. PCT/EP2009/058772, Nov. 28, 2011.
English Translation of Russian Decision to Grant RU Patent Application No. 2012104527, 6 pg.

* cited by examiner

METHODS AND APPARATUSES FOR INITIATING PROVISIONING OF SUBSCRIBER DATA IN A HSS OF AN IP MULTIMEDIA SUBSYSTEM NETWORK

CROSS-REFERENCE TO RELATED APPLICATION

This application is a 35 U.S.C. §371 national stage application of PCT International Application No. PCT/EP2009/058772, filed on 9 July 2009, the disclosure and content of which is incorporated by reference herein as if set forth in its entirety.

TECHNICAL FIELD

The present invention relates to a method and apparatus for provisioning subscriber data within nodes of an IP multimedia subsystem network.

BACKGROUND

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

The UMTS (Universal Mobile Telecommunications System) is a third generation wireless system designed to provide higher data rates and enhanced services to users. UMTS is a successor to the Global System for Mobile Communications (GSM), with an important evolutionary step between GSM and UMTS being the General Packet Radio Service (GPRS). GPRS introduces packet switching into the GSM core network and allows direct access to packet data networks (PDNs). This enables high-data rate packets switch transmissions well beyond the 64 kbps limit of ISDN through the GSM call network, which is a necessity for UMTS data transmission rates of up to 2 Mbps. UMTS is standardised by the 3rd Generation Partnership Project (3GPP) which is a conglomeration of regional standards bodies such as the European Telecommunication Standards Institute (ETSI), the Association of Radio Industry Businesses (ARIB) and others. See 3GPP TS 23.002 for more details.

The UMTS architecture includes a subsystem known as the IP Multimedia Subsystem (IMS) for supporting traditional telephony as well as new IP multimedia services (3GPP TS 22.228, TS 23.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet.

The IMS makes use of the Session Initiation Protocol (SIP) to set up and control calls or sessions between user terminals (or terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS.

Figure 1:
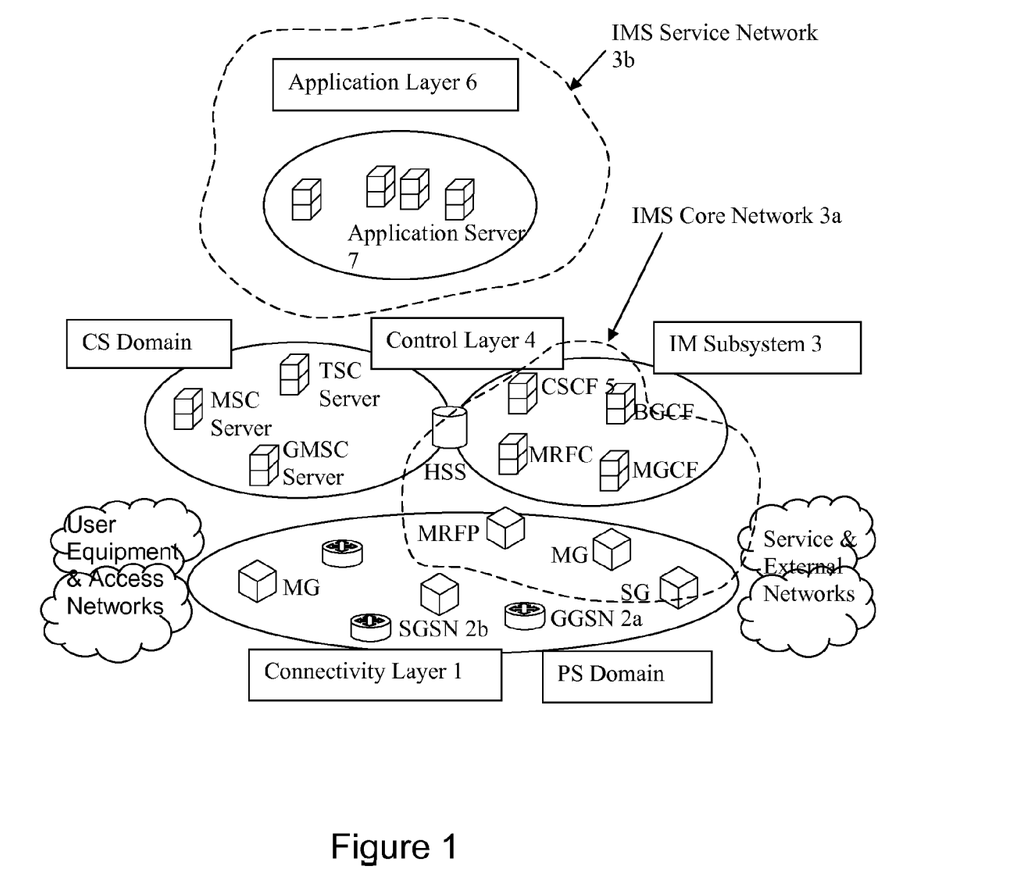
FIG. 1 illustrates schematically an IMS core network integrated into a communications system comprising 3GPP access networks (packet and circuit switched)

By way of example, FIG. 1 illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

Within the IMS service network, Application Servers (aSs) are provided for implementing IMS service functionality. Application Servers provide services to end users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment (or indeed for the purpose of any SIP method, session or non-session related). The IFCs are received by the S-CSCF from an HSS during the IMS registration procedure as part of a user's Subscriber Profile.

A precondition for a user to get access to the IMS and its services is that the user has previously been "provisioned" in the network, i.e. that subscriber and related service data has been registered in central databases such as the Home Subscriber Server (HSS) and Subscription Locator Function (SLF). Whenever a network operator wishes to launch a service over an IMS network, the operator is unlikely to know exactly which subscribers will wish to make use of the service. The operator has two options; either pre-provision the whole subscriber base in the IMS network, or implement some form of autoprovisioning method whereby subscribers can be provisioned as and when they subscribe to the service.

WO2007/099090 claims to disclose one such autoprovisioning method. More particularly, the document addresses the problem encountered when a subscriber attempts to register with the IMS when that subscriber is not provisioned in the IMS. At registration, legacy Home Location Register (HLR) subscriber data is extracted using the Radius accounting procedure and stored in the HSS database. The authentication and authorisation procedure is assumed to be performed in the GPRS network prior to accessing IMS. Therefore the received IMS register is assumed to be authentic. At the location query procedure the private ID (IMPI) is fetched and identified by comparing it with the earlier stored IMSI value, where the IPMI may be derived from the IMSI. [The IMSI is stored in GMS/UMTS AuC node and the IMPI in IMS AVG node for authentication purposes.] The available data will be stored in the HSS and the registration procedure will be successful.

A number of problems may arise with the procedure described in WO2007/099090. Firstly, the procedure depends on radius accounting being performed from the GPRS towards the HSS, and other authentication methods cannot be used. Secondly, in a multiple HSS network with a SLF, the SLF will not be provisioned with the HSS location of the subscriber, and the selection of an HSS for the subscriber will be made by the access network. Thirdly, the decision to provision the subscriber in the network is based only on the fact that a subscriber tries to access the network, and as such business aspects are not considered. Fourthly, the only data that can be stored in the HSS is what is received in the access attempt. Finally, the business and charging systems will not be aware of the provisioned subscriber.

SUMMARY

It is an object of the present invention to provide an IMS autoprovisioning mechanism that overcomes or at least mitigates the above noted problems. This is achieved by introducing a provisioning system, which may be external to the IMS network, and which is notified by the IMS of subscriber activity requiring provisioning. The provisioning system is able to provision data in a plurality of IMS nodes including an HSS.

According to a first aspect of the present invention there is provided a method of initiating the provisioning of subscriber data in at least a Home Subscriber Server of an IP Multimedia Subsystem network. The method comprises receiving an authentication request or Session Initiation Protocol message in respect of a given subscriber who is making use of a user terminal to access the IP Multimedia Subsystem network. If it is determined that subscriber data is not currently provisioned for the subscriber in a Home Subscriber Server function or receiving such a determination, the following steps are performed:
1) causing a first notification to be sent to the user terminal indicating that the registration attempt is rejected, and
2) sending a second notification to a subscriber provisioning system informing the provisioning system of the registration attempt.

Embodiments of the invention allow subscribers to be provisioned dynamically at multiple IMS network nodes, in a flexible manner which can take into account business factors, e.g. is a subscription valid.

The method may be implemented at a Home Subscriber Server, in which case the step of receiving an authentication request may comprise receiving an authentication request from a Serving Call Session Control Function of the IP Multimedia Subsystem network. Furthermore, the step of causing a first notification to be sent to the user terminal indicating that the registration attempt is rejected, may comprise sending a notification to said Serving Call Session Control Function indicating that authentication has been successfully completed and that the subscriber data for the subscriber is not yet provisioned in the Home Subscriber Server.

Considering further the case where the method is implemented at an HSS, the method may comprise receiving and storing subscriber data from said subscriber provisioning system sent in response to said second notification.

A received Session Initiation Protocol message may include one or more IP Multimedia Subsystem capabilities of the user terminal, the method comprising including these capabilities in said second notification. One or more network capabilities may also be included in the second notification.

The method may be implemented at a Serving Call Session Control Function as an alternative to, or in addition to, implementing the method at an HSS.

According to a second aspect of the present invention there is provided apparatus configured to provide a Home Subscriber Server function within an IP Multimedia Subsystem network. The apparatus comprises a receiver for receiving an authentication request in respect of a given subscriber who is making use of a user terminal to access the IP Multimedia Subsystem network, and an authenticator for authenticating the subscriber. The apparatus further comprises a determination unit for determining that subscriber data is not currently provisioned for the subscriber in the Home Subscriber Server function. A notification unit is provided which is responsive to such determination to,
1) cause a first notification to be sent to the user terminal indicating that the registration attempt is rejected,
2) send a second notification to a subscriber provisioning system informing the provisioning system of the registration attempt.

According to a third aspect of the present invention there is provided a method of provisioning subscriber data in at least a Home Subscriber Server of an IP Multimedia Subsystem network. The method comprises storing subscription data and network policies, and receiving from a node of said IP Multimedia Subsystem, a notification that a registration or service access attempt is being made by a subscriber for whom no subscription data is currently provisioned in a Home Subscriber Server of the IP Multimedia Subsystem network. The method further comprises determining subscriber data based upon said subscription data and network policies, and sending the determined subscriber data to said Home Subscriber Server of the IP Multimedia Subsystem network.

The node from which the notification is received may be said Home Subscriber Server, or another Home Subscriber Server.

According to a fourth aspect of the present invention there is provided apparatus configured to provision subscriber data in at least a Home Subscriber Server of an IP Multimedia Subsystem network. The apparatus comprises a memory for storing subscription data and network policies, and a receiver for receiving, from a node of said IP Multimedia Subsystem, a notification informing the apparatus of a registration or service access attempt by a subscriber for whom no subscription data is currently provisioned in the Home Subscriber Server. The apparatus further comprises a determination unit for determining subscriber data based upon said subscription data and network policies, and a sender for sending the determined subscriber data to said Home Subscriber Server.

According to a fifth aspect of the present invention there is provided method of provisioning subscriber data in at least a Home Subscriber Server of an IP Multimedia Subsystem network. The method comprises receiving within the IP Multimedia Subsystem network, a Session Initiation Protocol message from a user terminal. Upon a determination that subscriber data is not currently provisioned for the subscriber in the Home Subscriber Server, the following steps are implemented:
1) causing a first notification to be sent to the user terminal indicating that the registration attempt is rejected,
2) sending a second notification to a subscriber provisioning system informing the provisioning system of the registration attempt;
3) in response to receipt of said second notification at the provisioning system, provisioning subscriber data for the subscriber in said Home Subscriber Server or another Home Subscriber Server of the IP Multimedia Subsystem.

Upon receipt of a further Register message from said user terminal, subsequent IP Multimedia Subsystem registration can proceed on the basis of the provisioned subscriber data.

The second notification may be sent by the Home Subscriber Server.

Upon receipt of the Session Initiation Protocol message within the IP Multimedia Subsystem network, a subscriber associated with the user terminal may be authenticated to the Home Subscriber Server, e.g. by running an IP Multimedia Subsystem Authentication and Key Agreement procedure between the Home Subscriber Server and the user terminal.

The subscriber data that is provisioned in the Home Subscriber Server may include private and public user identities.

In response to receipt of said second notification at the provisioning system, subscriber data for the subscriber may be provisioned in one or more further nodes of the IP Multimedia Subsystem network. The or each further node may be one of:

a Subscription Location Function node;
a Domain Name System node/Enumeration node;
a Session Initiation Protocol Application Server.

The method may comprise receiving a Register message at an Interrogating Call Session Control Function of the IP Multimedia Subsystem network, and forwarding the Register message from the Interrogating Call Session Control Function to the Home Subscriber Server.

Upon a determination that the subscriber data is not currently provisioned for the subscriber in the Home Subscriber Server, the Interrogating Call Session Control Function of a Serving Call Session Control Function responsible for the subscriber is notified. The Register message is then forwarded to the identified Serving Call Session Control Function, and an authentication request sent from the Serving Call Session Control Function to the Home Subscriber Server.

Upon receipt of the authentication request at the Home Subscriber Server from the Serving Call Session Control Function, a second determination that the subscriber data is not currently provisioned for the subscriber in the Home Subscriber Server may be made, and thereafter steps 1) to 3) above performed.

The step of causing a first notification to be sent to the user terminal indicating that the registration attempt is rejected, may comprise sending a notification from the Home Subscriber Server to the Serving Call Session Control Function indicating that authentication has been successfully completed and that the subscriber data for the subscriber is not yet provisioned in the Home Subscriber Server. The Serving Call Session Control Function in turn sends a Session Initiation Protocol error message to the user terminal.

The Session Initiation Protocol error message may be a temporary unavailable message. Upon receipt of the temporary unavailable message at the client terminal, a further Register message may be automatically sent from the client terminal to the IP Multimedia Subsystem network.

The Session Initiation Protocol message may include one or more IP Multimedia Subsystem capabilities of the user terminal, the method comprising including these capabilities in said second notification. One or more network capabilities may also be included in said second notification.

DETAILED DESCRIPTION

The need to provision subscriber data at one or more IMS network nodes, in order to allow a subscriber to access IMS services, has already been described. It is proposed here to trigger the provisioning of the IMS system upon detection of activity of an authenticated user by notifying an external provisioning system of the activity, such that all affected nodes in the IMS network can be provisioned with the needed information.

Figure 2:
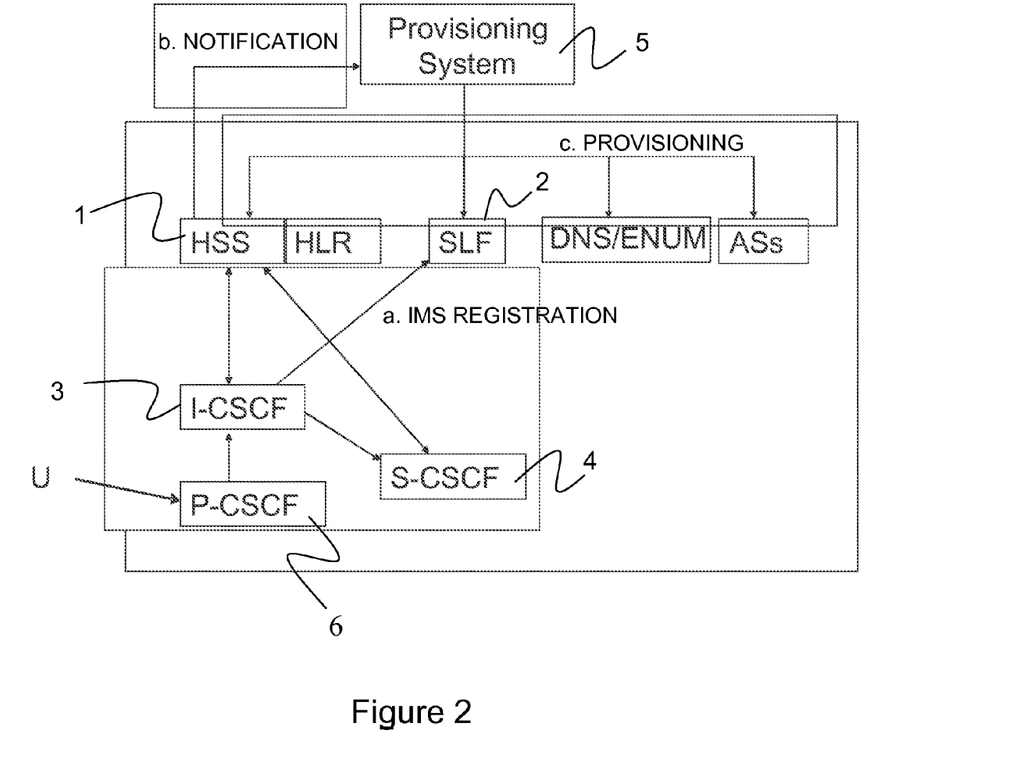
FIG. 2 illustrates schematically various nodes within an IMS network, and an external provisioning system.

FIG. 2 illustrates schematically various components of an IMS core network including a Home Subscriber Server (HSS) 1, a Subscription Location Function (SLF) 2, I-CSCF 3, and S-CSCF 4. An "external" provisioning system 5 communicates with the HSS, SLF, and other nodes of the IMS core network that require to be provisioned with subscriber data, via the LDAP or a Webservice interface (XML/SOAP/HTTP). The external provisioning system is typically maintained by the IMS network operator, and is provided with, or has access to, a database containing service information and subscription data. As indicated in the figure, user equipment (UE) interfaces with the IMS core network via a P-CSCF 6. All of the nodes illustrated in FIG. 2 are implemented using computer hardware including processors, memory, etc. Functionality may be implemented with the aid of appropriate software.

Figure 3:
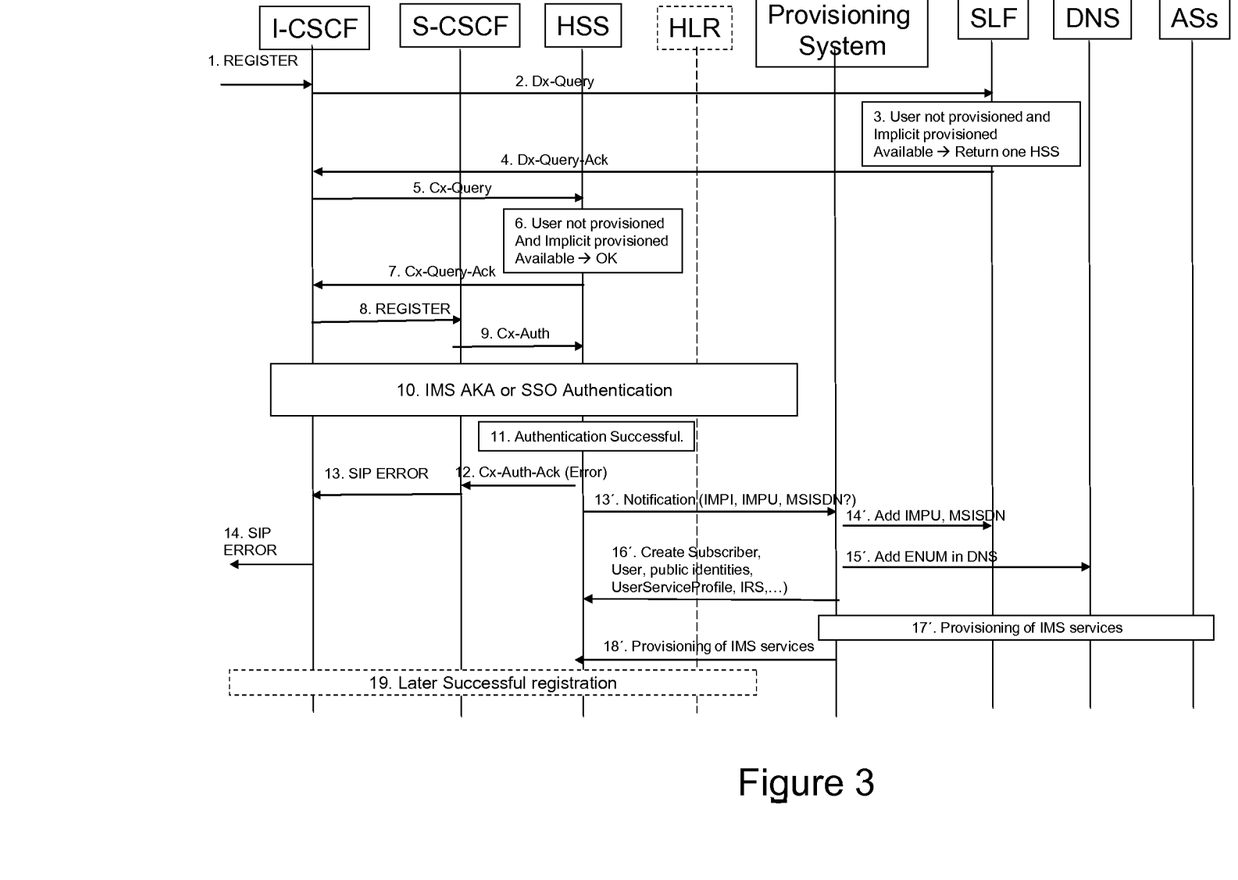
FIG. 3 shows signalling associated with an IMS autoprovisioning procedure within the system of FIG. 2.

FIG. 3 illustrates a message sequence associated with the auto-provisioning procedure, in the case where a subscriber sends an IMS REGISTER message to his home IMS network, and where the IMS network has not previously been provisioned with data for that subscriber. The sequence can be described further as follows, where the step numbers correspond to those of FIG. 3. In the sequence, reference is also made to the steps shown in the flow diagram of FIG. 4.

Figure 4:
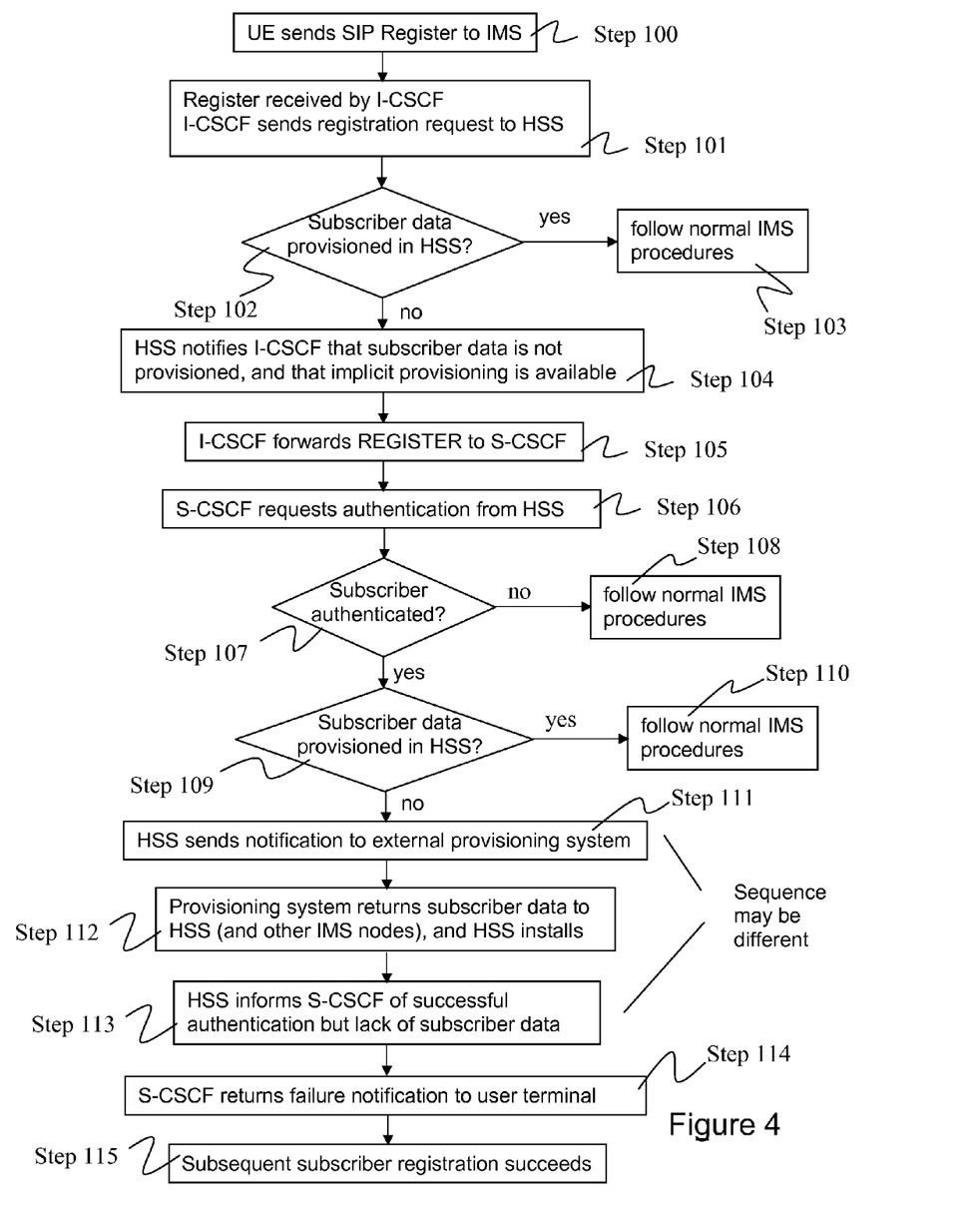
FIG. 4 is a flow diagram showing a process for autoprovisioning subscribers in an IMS network.

1. A user sends a SIP REGISTER message to the IMS network (step 100).
2. The I-CSCF receives the REGISTER and asks the SLF to identify to it any HSS to which the user is currently allocated (step 101).
3-4. In this example, the user is not currently provisioned and the SLF determines that "Implicit Provisioning" must be applied (step 102). The SLF returns to the I-CSCF the identity (address) of an HSS for handling the registration request (the SLF can decide which HSS is returned based on internal policies: domain based routing, number of users per HSS, etc). This behaviour is new in the SLF. Of course, if the IMS is provisioned for the subscriber, normal IMS procedures are followed (step 103).
5. The I-CSCF sends the registration request to the HSS
6-7. The HSS detects that the user is not provisioned and that Implicit Provisioning must be applied. It applies the default authorisation policies that have been defined and returns a "successful" answer to the I-CSCF (step 104).
8-9. The I-CSCF routes the registration request to the S-CSCF (step 105), and the S-CSCF asks the HSS to authenticate the user (step 106, 107). [If authentication is unsuccessful, again, normal IMS procedures are followed (step 108).]

10-11. The HSS detects that the user for whom authentication is requested is not provisioned (step 109) so it applies the one or possibly both of the following authentication methods:
  a) The HSS uses Early IMS Security assuming that it has received accounting information from the GGSN.
  b) It performs IMS AKA Authentication. Depending on whether a USIM or an ISIM has been used, the HSS may ask the HLR or another external authentication entity for the credential details.

[If subscriber data is provisioned, again, normal IMS procedures are followed (step 110).]

12. If the authentication is successful the HSS indicates this to the S-CSCF, but also indicating that the user is one that must be implicitly provisioned and, as such, that not all IMS nodes will currently be aware of the user (step 113). This behaviour is new in the HSS.

13-14. The S-CSCF returns a temporary unavailable error to the user, informing the user that a second registration must be performed after a defined interval (step 114). This behaviour is new in the S-CSCF.

13'. The HSS notifies the external provisioning system that a new user has been detected and authenticated, and that it must be provisioned in the IMS (step 111). To achieve this, the HSS sends to the provisioning system all available information (received identities of the user, MSISDN, need to create extra identities in case the registering identity is based on the IMSI for security reasons, etc). At this point, the supported capabilities (such as MMTeI, PoC, etc) also declared by the UE are sent to enable the provisioning system to provision the services that the device support and that are offered by the operator (supported capabilities have previously been sent from the S-CSCF to the HSS using the Cx interface). All of this behaviour is new in the HSS.

14'-18'. The provisioning system considers the business aspects relating to the provisioning of the user (black listing, subscription level, etc) and, assuming the outcome of this is successful, it provisions all of the required nodes within the IMS system (DNS, SLF, HSS, Charging system, services defined, etc) (step 112). The provisioning system can decide the services to provision based on internal policies and the indicated device capabilities.

19. The UE is aware that a second registration is needed, and performs this after the specified interval. This time, the user registration is successful and the user gains full access to all his/her IMS services (step 115).

Figure 5:
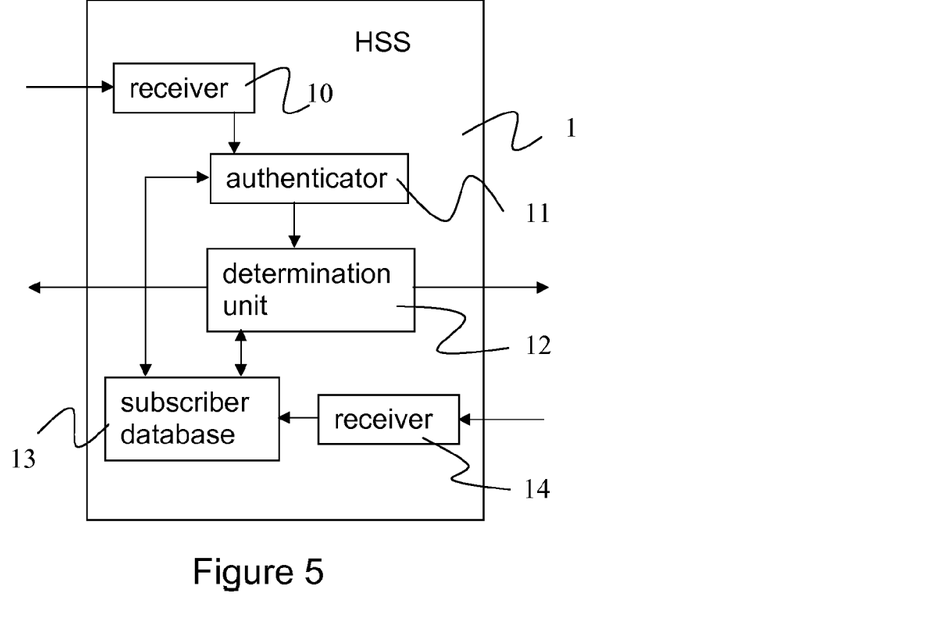
FIG. 5 illustrates schematically a Home Subscriber Server of an IMS network.

FIG. 5 illustrates schematically a Home Subscriber Server (HSS) 1 suitable for use in the described autoprovisioning procedure. The HSS comprises a first receiver 10 for receiving an authentication request in respect of a given subscriber who is making use of a user terminal to access the IP Multimedia Subsystem network, and an authenticator 11 for performing this authentication. A determining unit 12 is provided to determine whether or not subscriber data for the subscriber is currently provisioned in a subscriber database 13 of this (or another) HSS. The determining unit 12 is configured to notify both the external provisioning system and the user terminal in the event that data is not currently provisioned, and provisioning is required. The HSS comprises a second receiver 14 for receiving provisioning data from the provisioning system and for storing this data in the subscriber database 13.

Figure 6:
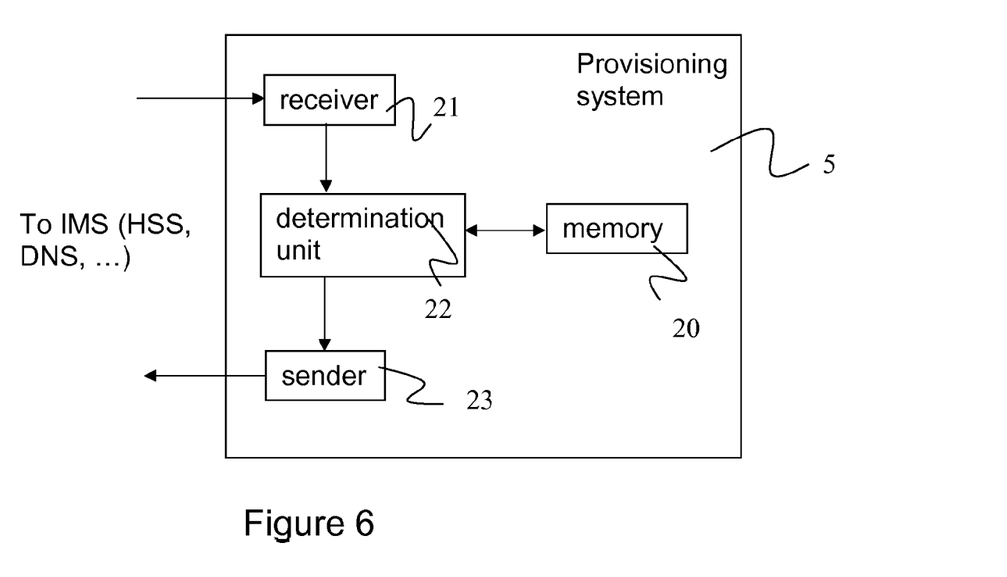
FIG. 6 illustrates schematically a provisioning system for provisioning subscribers at a node or nodes of an IMS network.

Referring now to FIG. 6, this illustrates a provisioning system node 5 for use with the described provisioning procedure. The node comprises a memory 20 for storing subscription data and network policies, and a receiver 21 for receiving, from a node of said IP Multimedia Subsystem, a notification informing the provisioning system of a registration or service access attempt by a subscriber for whom no subscription data is currently provisioned in an HSS of the IMS network. A determination unit 22 is configured to determine subscriber data based upon said subscription data and network policies, typically installed by the network operator. A sender 23 is configured to send the determined subscriber data to the HSS allocated to the subscriber.

The provisioning procedure presented here leverages on the 3GPP IMS authentication methods such as IMS-AKA. All the necessary entities in the IMS can be autoprovisioned, reducing the need to have subscriber "knowledge" in the network prior to any subscriber activity. By utilizing a provisioning system to activate the subscription, the subscriber data held at various nodes across the network may be kept consistent. A number of services may be provisioned simultaneously. A master database or similar could also be maintained with subscriber data.

It will be appreciated by the person of skill in the art that various modifications may be made to the above described embodiments without departing from the scope of the present invention.

The invention claimed is:

1. A method of provisioning subscriber data in an IP Multimedia Subsystem network, the method comprising, at a Home Subscriber Server of the IP Multimedia Subsystem network:
  receiving an authentication request from a Serving Call Session Control Function of the IP Multimedia Subsystem network or Session Initiation Protocol message in respect of a given subscriber who is making use of a user terminal to access the IP Multimedia Subsystem network;
  determining that subscriber data is not currently provisioned for the subscriber in a Home Subscriber Server; and
  responsive to the determining,
  1) sending a first notification to said Serving Call Session Control Function indicating that authentication has been successfully completed and that the subscriber data for the subscriber is not yet provisioned in the Home Subscriber Server indicating that the registration attempt is rejected, and
  2) sending a second notification to a subscriber provisioning system informing the provisioning system of the registration attempt,
  the method further comprising, at the Home Subscriber Server, receiving subscriber data from said subscriber provisioning system sent in response to said second notification, and storing said subscriber data,
  wherein the Session Initiation Protocol message comprises one or more IP Multimedia Subsystem capabilities of the user terminal, and
  wherein the second notification to the subscriber provisioning system comprises the IP Multimedia Subsystem capabilities of the user terminal.

2. A method according to claim 1 further comprising including one or more network capabilities in the second notification.

3. A method according to claim 1, wherein the IP Multimedia Subsystem capabilities were received, prior to sending the second notification, by the Home Subscriber Server from a Serving Call/Session Control Function (S-CSCF).

4. A method according to claim 1, wherein the IP Multimedia Subsystem capabilities comprise Multimedia Telephony service (MMTel) or Push-to-talk over cellular (PoC).

5. Apparatus comprising a Home Subscriber Server configured to provide a Home Subscriber Server function within an IP Multimedia Subsystem network, the apparatus comprising:
 a receiver configured to receive an authentication request from a Serving Call Session Control Function of the IP Multimedia Subsystem network in respect of a given subscriber who is making use of a user terminal to access the IP Multimedia Subsystem network;
 an authenticator configured to authenticate the subscriber;
 a determination unit configured for determining that subscriber data is not currently provisioned for the subscriber in the Home Subscriber Server function; and
 a notification unit responsive to the determination configured to,
  1) send a first notification to said Serving Call Session Control Function indicating that authentication has been successfully completed and that the subscriber data for the subscriber is not yet provisioned in the Home Subscriber Server indicating that the registration attempt is rejected, and
  2) send a second notification to a subscriber provisioning system informing the provisioning system of the registration attempt,
 wherein the authentication request comprises one or more IP Multimedia Subsystem capabilities of the user terminal, and
 wherein the second notification to the subscriber provisioning system comprises the IP Multimedia Subsystem capabilities of the user terminal.

6. The apparatus according to claim 5, wherein the IP Multimedia Subsystem capabilities were received, prior to sending the second notification, by the Home Subscriber Server function from a Serving Call/Session Control Function (S-CSCF).

7. The apparatus according to claim 5, wherein the IP Multimedia Subsystem capabilities comprise Multimedia Telephony service (MMTel) or Push-to-talk over cellular (PoC).

8. A method of provisioning subscriber data in at least a Home Subscriber Server of an IP Multimedia Subsystem network, the method comprising:
 receiving within the IP Multimedia Subsystem network, a Session Initiation Protocol message from a user terminal;
 upon a determination that subscriber data is not currently provisioned for the subscriber in the Home Subscriber Server,
  1) sending a first notification to said Serving Call Session Control Function indicating that authentication has been successfully completed and that the subscriber data for the subscriber is not yet provisioned in the Home Subscriber Server indicating that the registration attempt is rejected,
  2) sending a second notification to a subscriber provisioning system informing the provisioning system of the registration attempt, and
  3) in response to receipt of said second notification at the provisioning system, provisioning subscriber data for the subscriber in said Home Subscriber Server or another Home Subscriber Server of the IP Multimedia Subsystem;
 upon receipt of a further Register message from said user terminal, proceeding with subsequent IP Multimedia Subsystem registration on the basis of the provisioned subscriber data, and
 in response to receipt of said second notification at the provisioning system, provisioning subscriber data for the subscriber in one or more further nodes of the IP Multimedia Subsystem network.

9. A method according to claim 8 further comprising, upon receipt of the Session Initiation Protocol message within the IP Multimedia Subsystem network, authenticating a subscriber associated with the user terminal to the Home Subscriber Server.

10. A method according to claim 8, wherein each further node is one of:
 a Subscription Location Function node;
 a Domain Name System node/Enumeration node; and
 a Session Initiation Protocol Application Server.

11. A method according to claim 8 further comprising:
 receiving a Register message at an Interrogating Call Session Control Function of the IP Multimedia Subsystem network, and forwarding the Register message from the Interrogating Call Session Control Function to the Home Subscriber Server;
 making a first determination that the subscriber data is not currently provisioned for the subscriber in the Home Subscriber Server, and notifying the Interrogating Call Session Control Function of a Serving Call Session Control Function responsible for the subscriber; and
 forwarding the Register message to the identified Serving Call Session Control Function, and sending an authentication request from the Serving Call Session Control Function to the Home Subscriber Server.

12. A method according to claim 11 further comprising:
 upon receipt of the authentication request at the Home Subscriber Server from the Serving Call Session Control Function, making a second determination that the subscriber data is not currently provisioned for the subscriber in the Home Subscriber Server and thereafter performing the sending the first notification, the sending the second notification, and the provisioning subscriber data.

13. A method according to claim 12, wherein the sending a first notification to the user terminal indicating that the registration attempt is rejected, comprises sending a notification from the Home Subscriber Server to the Serving Call Session Control Function indicating that authentication has been successfully completed and that the subscriber data for the subscriber is not yet provisioned in the Home Subscriber Server, the Serving Call Session Control Function in turn sending a Session Initiation Protocol error message to the user terminal.

14. A method according to claim 13, wherein said Session Initiation Protocol error message is a temporary unavailable message.

15. A method according to claim 11 further comprising, upon receipt of the temporary unavailable message at the client terminal, automatically sending a further Register message from the client terminal to the IP Multimedia Subsystem network.

16. A method according to claim 8, wherein said Session Initiation Protocol message includes one or more IP Multimedia Subsystem capabilities of the user terminal, the method comprising including these capabilities in said second notification.

17. A method according to claim 16 further comprising including one or more network capabilities in said second notification.

* * * * *